US012641347B2

(12) United States Patent
Krammer et al.

(10) Patent No.: US 12,641,347 B2
(45) Date of Patent: May 26, 2026

(54) METHOD AND SYSTEM FOR DATA TRANSMISSION

(71) Applicant: Siemens Aktiengesellschaft, Munich (DE)

(72) Inventors: Lukas Krammer, Vienna (AT); Daniel Lechner, Poysdorf (AT); Andreas Hofmann, Vienna (AT); Leopold Resel, Vienna (AT); Felix Knorr, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/838,691

(22) PCT Filed: Feb. 15, 2023

(86) PCT No.: PCT/EP2023/053805
§ 371 (c)(1),
(2) Date: Aug. 15, 2024

(87) PCT Pub. No.: WO2023/156483
PCT Pub. Date: Aug. 24, 2023

(65) Prior Publication Data
US 2025/0240539 A1 Jul. 24, 2025

(30) Foreign Application Priority Data
Feb. 16, 2022 (EP) ..................................... 22157122

(51) Int. Cl.
*H04N 25/531* (2023.01)
*H04L 9/40* (2022.01)
(52) U.S. Cl.
CPC ........... *H04N 25/531* (2023.01); *H04L 63/08* (2013.01)

(58) Field of Classification Search
CPC .. H04N 25/531; H04L 63/08; H04B 10/1149; H04B 10/116
See application file for complete search history.

(56) References Cited

U.S. PATENT DOCUMENTS 5,185,609 A * 2/1993 DeBord ..................... G01S 1/48
342/173
2014/0270796 A1 9/2014 Jovicic et al.
(Continued)

FOREIGN PATENT DOCUMENTS

WO 2013109934 7/2013
WO 2014063150 4/2014

OTHER PUBLICATIONS

PCT International Search Report dated May 26, 2023 corresponding to PCT International Application No. PCT/EP2023/053805 filed Feb. 15, 2023.

*Primary Examiner* — Michael E Teitelbaum
(74) *Attorney, Agent, or Firm* — Cozen O'Connor

(57) ABSTRACT
A method for data transmission in a system includes a) providing at least one piece of data information, b) modulating a carrier signal using the at least one piece of data information to form a modulated signal, c) transmitting the modulated signal, d) receiving the light signal through a camera, which captures an image, sequentially in time, as image rows or image columns, e) determining a first piece of image information and at least one second piece of image information from the image through row-wise or column-wise readings, f) forming a data stream by concatenating the first and the at least one second piece of image information, and g) calculating the signal frequency from the data stream and identifying the at least one piece of data information from the signal frequency.

19 Claims, 2 Drawing Sheets

(56)         References Cited

U.S. PATENT DOCUMENTS

2015/0028763 A1*    1/2015  Feri ..................... H05B 47/195
                                                    315/210
2016/0323035 A1*   11/2016  Jovicic .............. H04B 10/0795
2019/0242976 A1*    8/2019  Grabowski ............ G01S 7/484

* cited by examiner

METHOD AND SYSTEM FOR DATA TRANSMISSION

CROSS-REFERENCE TO RELATED APPLICATIONS

This is a U.S. national stage of application No. PCT/EP2023/053805 filed 15 Feb. 2023. Priority is claimed on European Application No. 22157122.7 filed 16 Feb. 2022, the content of which is incorporated herein by reference in its entirety.

BACKGROUND OF THE INVENTION

1. Field of the Invention

The invention relates to a method for data transmission in a system, comprising a transmitter with a modulation device and a light emitter, as well as a receiver with a camera, in which image capture occurs sequentially in time as image rows or image columns, and a computing device with a memory, where the method includes a) providing at least one piece of data information, b) modulating a carrier signal with a carrier frequency by the modulation device using the at least one piece of data information to form a modulated signal, c) transmitting the modulated signal as a light signal by the light emitter of the transmitter, d) receiving the light signal by the camera of the receiver, which captures an image, comprising image rows and image columns, sequentially in time as image rows or image columns, where an image row or an image column is captured at least twice as fast as the period duration of the carrier signal.

The invention also relates to a system for data transmission, comprising a transmitter with a modulation device and a light emitter, a receiver with a camera, in which image capture occurs sequentially in time as image rows or image columns, and a computing device with a memory.

2. Field of the Invention

Automation components in electrical systems are becoming ever more powerful and complex. Accordingly, the demand for inspection and maintenance is also growing. While many devices already support remote maintenance and diagnosis, simpler components like power supplies are typically not integrated in the automation network, but play a critical role in the functioning of the overall system.

Corresponding interfaces and diagnostic devices are needed to enable digital maintenance and diagnosis for such devices. The cost of hardware and software, both for the device itself and for the diagnostic device, is enormous, especially with a large number of corresponding devices. No additional hardware should ideally be required for an interface like this. No specific hardware (dedicated diagnostic or reading devices) should be needed for the diagnostic device either.

Remote diagnosis is generally possible for components that are connected to the installation network. Diagnosis and maintenance are often performed locally, however. For diagnosis to be performed on a device, it first must be located in the automation system. There are then challenges with regard to connectivity in the field, identification of the device, or access to the device (security), as well as limited access to a device and isolation of other participants in the automation system or communication network (namely unauthorized access of a service technician to other critical installation components). A local interface would thus likewise be beneficial here, even if the device is effectively integrated in the automation system.

Diagnosis of automation components was previously performed either through the installation network and the automation system or, in the case of simpler unconnected devices, via local interfaces.

This often involved establishing simple wired interfaces such as RS232 or RS485 and communication via simple proprietary protocols. Alongside the additional expense for the hardware required for the interface (incl. connectors, protection class), there are also other challenges in terms of absence of reaction, EMC, and conformity. Moreover, dedicated diagnostic hardware is required for this type of interface (for example, handheld or PC with corresponding interface card).

Alternatively, wireless interfaces like Bluetooth, Wi-Fi, or similar proprietary radio systems can be used. This does require significant expansion of the hardware, however, which is again connected with corresponding additional costs (hardware, EMC, conformity, . . . ). Dedicated hardware is also required for diagnosis when using proprietary systems (for example, own diagnostic device or interface for PC). Furthermore, additional challenges arise with radio systems in terms of access protection, security, and failure susceptibility. The emission of radio waves is also a critical topic in some areas of the industry.

SUMMARY OF THE INVENTION

It is an object of the invention is to provide a digital interface for a technical device, which communicates data from the device to a receiver such as a mobile device in a simple manner, especially with regard to access protection, security, and failure susceptibility.

This and other objects and advantages are achieved in accordance with the invention by a method, where the following are performed:

e) determination by the computing device of a first piece of image information and at least one second piece of image information from the image by reading row-by-row or column-by-column, analogous to the capture in step d), which are each based on at least one section of the respective image rows or image columns;

f) formation of a data stream through the concatenation of the first and at least one second piece of image information by the computing device; and g) calculation of the signal frequency from the data stream and identification of the at least one piece of data information from the signal frequency by the computing device.

This simple method enables data to be communicated at a high data rate from the device to a receiver, such as a mobile device.

Improved access protection is also guaranteed, because the optical transmission means that data can only be received in the immediate environment and that unauthorized persons cannot hack the data by infiltrating a connected IT network and thus adversely affect data security.

The solution is also less susceptible to failure because the system is based on a very simple and robust principle.

The technical approach of the invention is based on applying the properties of an electronic shutter together with complementary metal-oxide semiconductor (CMOS) sensors, as used in conventional cameras with electronic image sensors, such as in cell phones, especially for the detection of a communication in the optically visible range.

These properties also give rise to the usually unwanted rolling shutter effect in a camera of the aforementioned type.

The rolling shutter effect is a position error that can occur in photos or video recordings of moving objects.

It seems obvious at first that all points of the light-sensitive sensor element of a camera experience exposure at the exact same time, as is also the case with analogue photography using a mechanical shutter.

There are cameras, however, where by design this is not the case for the entire surface. The received light signal can change during the reading process of a row or column, however, due to reading row-by-row or column-by-column, which is effected sequentially in time.

When all the rows are put together into an overall image, the image would therefore change compared with the light signal that has changed in the meantime, which means the light signal cannot be depicted as a whole all at once, but only row-by-row at different times, for example.

The invention uses this effect to improve and increase the frame rate by capturing the light signal for each row-by-row or column-by-column reading process, which results in a sensor data sequence scanned at a much higher rate than is the case for an entire image.

The rolling shutter effect occurs on cameras with digital cameras with image converters using CMOS sensor technology, for example, because these sensors read the image row-by-row or column-by-column.

In an embodiment of the invention, the first and at least one second piece of image information from the image is obtained during determination by aggregating sections of the image rows or image columns. This can further improve interference resistance and enhance the optical sensitivity of the camera.

In an embodiment of the invention, the signal frequency is calculated from the data stream using a fast Fourier transform (FFT). This facilitates reliable determination of the signal frequency and increases sensitivity to interference.

Additionally, multiple temporally sequential modulation states can be captured at the same time if the set evaluation interval is correspondingly long, i.e., extends across multiple bits in the at least one piece of data information.

In a further embodiment of the invention, the signal frequency is calculated from the data stream using the Goertzel algorithm.

The Goertzel algorithm is a method from digital signal processing and is a particular form of the discrete Fourier transform (DFT). In contrast to the various rapid calculation methods for the discrete Fourier transform (FFT), which always calculate all discrete spectral components in one block, with the Goertzel algorithm it is possible to calculate individual discrete spectral components only.

The algorithm is based on a structure that comprises a digital filter extended by a state controller. The states divide the calculation into the backward branch, in which the input values scanned in the time range are loaded, and a forward branch, which supplies the output signal. The backward loop is passed through for each digital sample value and is structured as a recursive digital filter with two state memories and an accumulator. The forward branch is only passed through once after N sample values and supplies the calculated complex output value from the state memories, i.e., the spectral component according to magnitude and phase.

The frequency selectivity can be altered by selecting the filter coefficients to be used. The Q-factor can be influenced by selecting the number of sample values. N can be any natural value.

However, a discrete Goertzel structure is necessary for each spectral component. This algorithm is therefore especially advantageous and can be used with less computing time if the required calculation is for individual spectral components only rather than the complete spectrum.

The Goertzel algorithm is extremely convenient and easy to implement. The calculation time is also shorter than that of other conventional methods, especially if the target frequencies that need to be detected are already known as they are in this method.

In another embodiment of the invention, the modulation of the modulated signal is amplitude, frequency, and/or phase modulation, and the modulation frequency of the modulated signal is at least 50 Hz, preferably at least 500 Hz, in particular preferably at least 1000 Hz. As a result, the transmission rate of the data information can be substantially improved compared with an evaluation of the entire camera image.

In a further embodiment of the invention, the modulation of the modulated signal is frequency modulation and the modulated frequencies for individual modulation states not to be harmonic to each other. This makes it easier to calculate the signal frequency as ambiguities that might unfavorably influence the evaluation are avoided.

In an embodiment of the invention, the modulation of the modulated signal has a duty cycle of at least 50%, preferably at least 75%. A high light intensity can be achieved for the light emitter in this way, improving the range between transmitter and receiver and the failure susceptibility while at the same time not impairing a signal function of the emitter, such as an operating status display.

In a still further embodiment of the invention, the modulation of the modulated signal has a constant duty cycle across individual modulation states. This makes it possible to achieve, for the light emitter, that the emitted light does not flicker for the observer, which improves a piece of information in terms of reliability for the technical device and does not impair the observer's trust in the device.

Flickering would absolutely be undesirable in particular if the light emitter were simultaneously being used for an operating display of the operating status of the technical device, because the observer could wrongly interpret this as a fault of the technical device.

In another embodiment of the invention, the carrier frequency is constant. This makes it possible to calculate the signal frequency in a simple way from the data stream and for the robustness of the system to be enhanced.

In a further embodiment of the invention, the at least one piece of data information comprises device-specific information, authorization information, or authentication information. This enables device-specific information, access information, authorization information, or authentication information, for example, to be sent from the device via the optical interface to the receiver in a smartphone, for example.

High interception protection is achieved as the optical signal can only be received locally.

The objects and advantages are also achieved in accordance with the invention via an aforementioned system, where the method in accordance with the disclosed embodiments of invention are implemented.

In an embodiment of the invention, the transmitter to comprises a technical device with an optical operating status indicator, and the light emitter is formed by the operating status indicator, the receiver also comprises a mobile device, especially a smartphone or tablet computer.

This facilitates simple and cost-effective realization of the system in accordance with the invention.

The operating status indicator can, for example, be a light-emitting diode or elements of a digital display.

In a further embodiment of the invention, the at least one piece of data information comprises device-specific information, authorization information, or authentication information for the technical device, which is intended for data transmission in the system.

Device-specific information, authorization information, or authentication information can be provided in the form of data information, can be sent from the transmitter, and can be received by the receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to an exemplary embodiment summarized in the attached drawings, in which.

DETAILED DESCRIPTION OF THE EXEMPLARY EMBODIMENTS

Figure 1:
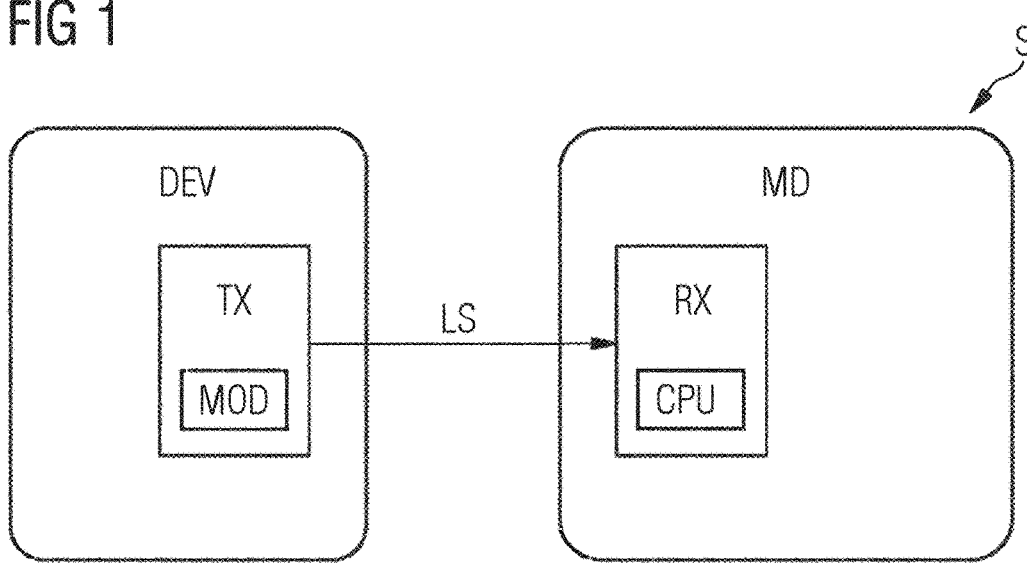
FIG. 1 shows a block diagram for an exemplary embodiment of the invention.

FIG. 1 shows a block diagram for an exemplary embodiment of the invention.

Shown is FIG. 1 is a system S for data transmission, comprising a technical device DEV, which has a transmitter TX with a modulation device MOD and a light emitter.

The light emitter can be an operating status indicator of the device DEV and, for example, a light-emitting diode or elements of a digital display of the device DEV.

Moreover, the system S comprises a mobile radio device MD, a smartphone, with a receiver RX with a camera, and a computing device CPU with a memory.

The computing device can, for example, be a microprocessor or a digital signal processor, a programmable logic, or similar.

Figures 3, 4, 5, 6, 7:
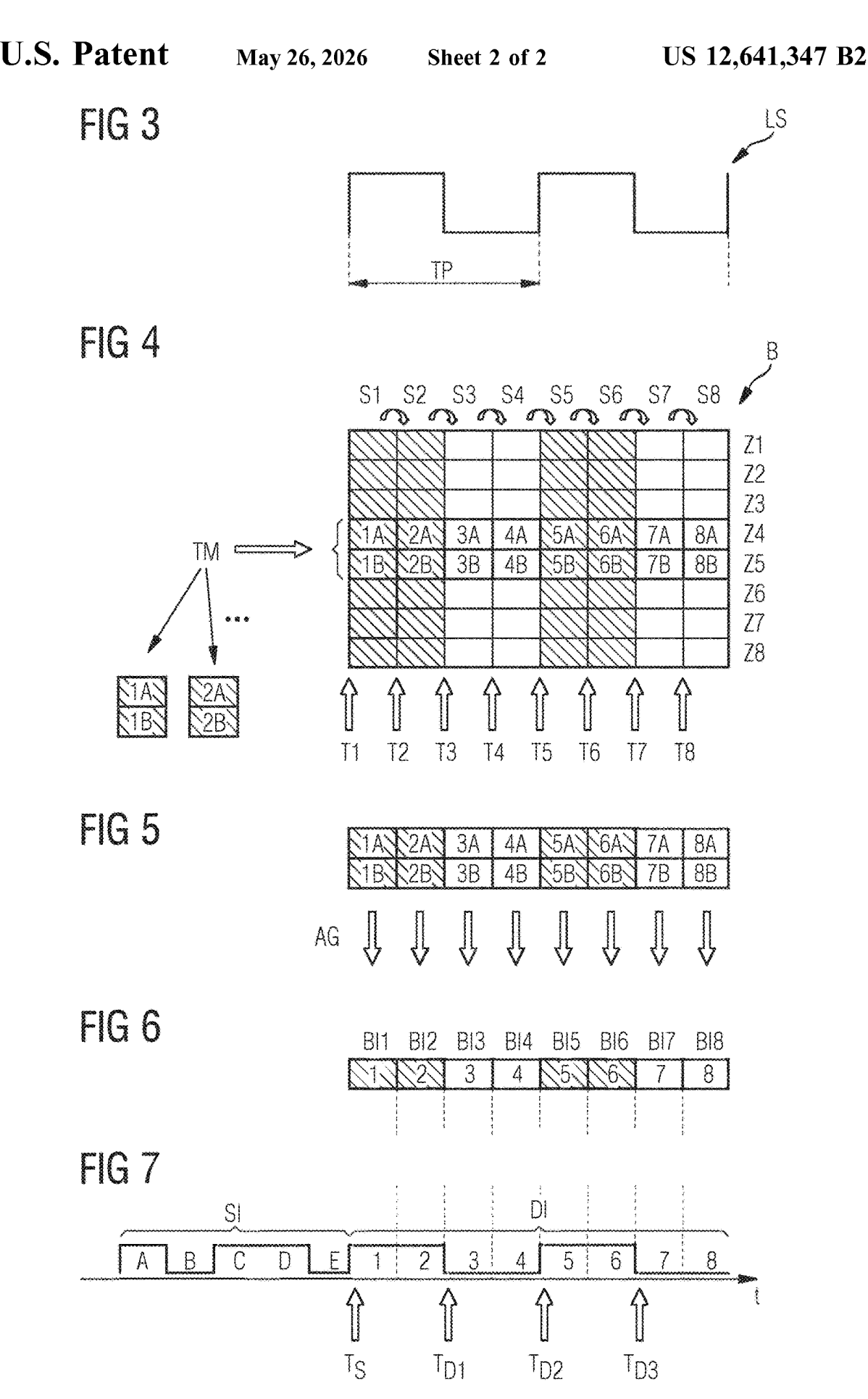
FIG. 3 shows an exemplary modulated light signal.
FIG. 4. shows an example of a light signal received with a camera sensor in accordance with FIG. 3.
FIG. 5 shows an example of a signal read column-by-column of sections of the image in accordance with FIG. 4.
FIG. 6 shows an example of an aggregated signal from FIG. 5.
FIG. 7 shows an example of a data stream formed from the aggregated signal in accordance with FIG. 6.

Image capture in the camera is effected sequentially in time in the form of image rows Z1-Z8 or alternatively in the form of image columns S1-S8, as detailed in FIG. 4.

A light signal LS is in the optically visible range and is transmitted by the emitter to the camera sensor.

The invention is based on an effectively disadvantageous feature of the camera and utilizes the property of an electronic shutter, which leads to a rolling shutter effect.

During image capture with the electronic shutter, the exposure of a complete image does not occur at the exact same time.

The exposure and the reading of the image information occur row-by-row or column-by-column at a relatively high speed.

This means signals can be transmitted by a sufficiently large light emitter, i.e., the image section extends across multiple rows or columns with the light emitter. The critical factor here is the row frequency or the exposure time of a row or column.

Figure 2:
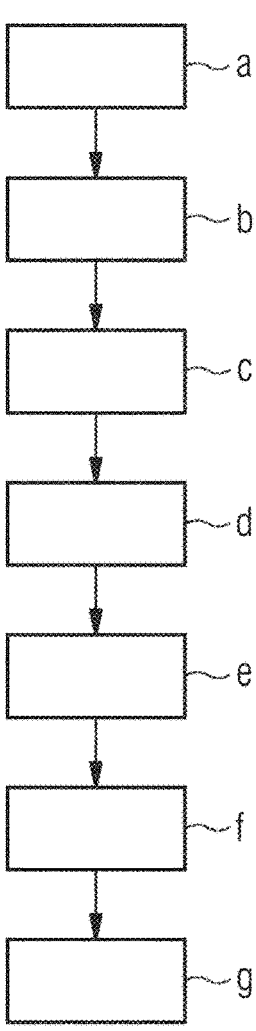
FIG. 2 shows a flow chart of the method in accordance with the invention.

FIG. 2 shows a flow chart of the method in accordance with the invention, where the following are performed:
   a) provision of at least one piece of data information,
   b) modulation of a carrier signal with a carrier frequency by the modulation device MOD using the at least one piece of data information to form a modulated signal,
   c) transmission of the modulated signal as a light signal LS by the light emitter of the transmitter TX,
   d) reception of the light signal LS by the camera of the receiver RX, which captures an image B, comprising image rows Z1-Z8 and image columns S1-S8, sequentially in time in the form of image rows Z1-Z8 or image columns S1-S8, where an image row Z1-Z8 or an image column S1-S8 is captured at least twice as fast as the period duration TP of the carrier signal,
   e) determination by the computing device CPU of a first piece of image information BI1 and at least one second piece of image information BI2-BI8 from the image B by reading row-by-row or column-by-column, analogous to the capture in step d), which are each based on at least one section TM of the respective image rows Z1-Z8 or image columns S1-S8,
   f) formation of a data stream through the concatenation of the first and at least one second piece of image information BI1, BI2-BI8 by the computing device CPU, and
   g) calculation of the signal frequency from the data stream and identification of the at least one piece of data information DI from the signal frequency by the computing device CPU.

The modulation of the modulated signal can be amplitude, frequency, and/or phase modulation.

The modulation frequency of the modulated signal for a high data transmission rate is at least 50 Hz or higher, preferably at least 500 Hz, in particular preferably at least 1000 Hz.

If frequency modulation is used for modulation of the modulated signal, then the modulated frequencies for individual modulation states of the modulation should not be harmonic to each other.

For example, a frequency in the modulated signal can be 500 Hz for transmission of a logical "0" state, and a frequency in the modulated signal can be 700 Hz for transmission of a logical "1" state.

Polyvalent modulation is also possible, i.e., three different frequencies can be selected for transmission of trivalent information, such as 1000 Hz, 1100 Hz, and 1200 Hz.

The modulation of the modulated signal has a duty cycle of at least 50%, in order to maintain a high brightness of the light-emitting diode.

A higher duty cycle only has a slight effect on the brightness of the LED and is not or hardly noticeable for users of the device DEV.

The modulation of the modulated signal also has a constant duty cycle across individual modulation states, in order to prevent users of the device DEV noticing unwanted flickering.

The carrier frequency is constant for simple evaluation of the data stream.

FIG. 3 shows an example of a modulated light signal with a period duration TP.

FIG. 4 shows an example of a light signal LS received by the camera sensor in accordance with FIG. 3.

The camera of the receiver RX captures an image B sequentially in time in the form of image columns S1-S8.

The image has image rows Z1-Z8 and image columns S1-S8.

An image column S1-S8 is captured at least twice as fast as the period duration TP of the carrier signal.

A subset TM is formed across multiple rows Z4, Z5 for each column S1-S8.

FIG. 5 shows an example of a signal of sections of the image that has been read column by column in accordance with FIG. 4.

A first piece of image information BI1 and additional image information BI2-BI8 from the image B is determined by column-by-column reading of the camera.

FIG. 6 shows an example of an aggregated signal in accordance with FIG. 5.

During determination, the first and second pieces of image information BI1, BI2-BI8 from the image B can optionally be obtained through the aggregation AG of sections TM of the image rows Z1-Z8, in order to improve signal quality.

Alternatively, just one row from the image B can also be processed.

The computing device CPU then forms a data stream by concatenating the first and second pieces of image information BI1, BI2-BI8.

FIG. 7 shows an example of a data stream formed from the aggregated signal in accordance with FIG. 6.

The signal frequency can be calculated from the data stream using a fast Fourier transform (FFT).

This can, for example, improve the signal quality of the light signal LS.

Ambient light, such as that produced by LED lighting, can easily be filtered out, for example.

Lighting technology typically uses very similar frequencies in the range of 600-1000 Hz.

Therefore, if an FFT or a comparable method for extraction and detection of different frequencies is applied to the section of a frame, then the basic frequency, and thus the corresponding signal in the frequency range, can clearly be identified.

Depending on the size of the LED, the distance between the smartphone and device, and thus the relative size of the LED in the image, as well as the row frequency, significantly different values also result for the different frequencies used for the transmission when evaluating the FFT.

The different parameters that influence the "measured" frequency, such as smartphone technology and/or LED size, are not significant for detection, because only the relative frequency shifts between the bits in the data stream are relevant for decoding.

The frame rate, and thus the row frequency, is comparable in standard video mode and sufficient for detection despite extremely diverse smartphone technologies.

Slow motion modes, which are realized in different ways on many smartphones, are not required. The FFT can effectively be calculated column-by-column across the image, resulting in an image containing a series of pixels that are temporally and spatially offset.

Values for individual or selected FFTs can be added up, which results in an individual discrete spectrum and simplifies decoding.

Alternatively, times TD1, TD2, and TD3 for signal changes in the data stream can also be determined for frequency measurement.

A start time TS can first be determined for this purpose by providing the transmitter with a start sequence SI in addition to the data information DI, which is transmitted and then received with the receiver. If the start sequence SI is detected, then a signal is sent that a data sequence will follow.

It is easy to calculate the signal frequency from the times TD1, TD2, and TD3.

A bit interval in the data stream extends across multiple frames of the video, because decoding occurs asynchronously in relation to coding.

When using a simple UART transmission with start bit, 8 data bits, a parity bit, and a frame rate of 60 fps (16.6 ms per frame), it is advantageous for the bit interval to be >50 ms long, because this ensures that at least two frames decode the bit completely and correctly and enables majority voting to be used for decoding. However, this requires a constant bit rate between the transmitter and receiver to be agreed in advance. Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data transmission in a system comprising a transmitter having a modulation device and a light emitter, a receiver having a camera, in which image capture occurs sequentially in time as image rows or image columns, and a computing device having memory, the method comprising:

a) providing at least one piece of data information;

b) modulating a carrier signal with a carrier frequency by the modulation device utilizing the at least one piece of data information to form a modulated signal;

c) transmitting the modulated signal as a light signal by the light emitter of the transmitter;

d) receiving the light signal by the camera of the receiver, which captures an image, comprising image rows and image columns, sequentially in time as image rows or image columns, an image row or an image column being captured at least twice as fast as a period of duration of the carrier signal;

e) determining, by the computing device, a first piece of image information and at least one second piece of image information from the image by reading row-by-row or column-by-column, analogous to the capture in step d), which are based on at least one section of respective image rows or image columns;

f) forming a data stream via concatenation of the first and at least one second piece of image information by the computing device; and g) calculating a signal frequency from the formed data stream and identifying the at least one piece of data information from the signal frequency by the computing device.

2. The method as claimed in the claim 1, wherein, during said determining, the first and at least one second piece of image information from the image are obtained via aggregation of sections of the image rows or image columns.

3. The method as claimed in claim 2, wherein the signal frequency is calculated from the data stream via a fast Fourier transform.

4. The method as claimed in claim 1, wherein the signal frequency is calculated from the data stream utilizing a Goertzel algorithm.

5. The method as claimed in claim 2, wherein the signal frequency is calculated from the data stream utilizing a Goertzel algorithm.

6. The method as claimed in claim 3, wherein the signal frequency is calculated from the data stream utilizing a Goertzel algorithm.

7. The method as claimed in claim 1, wherein the modulation of the modulated signal is at least one of amplitude, frequency and phase modulation; and wherein a modulation frequency of the modulated signal is at least 50 Hz.

8. The method as claimed in claim 7, wherein the modulation frequency of the modulated signal is at least 500 Hz.

9. The method as claimed in claim 8, wherein the modulation frequency of the modulated signal is at least 1000 Hz.

10. The method as claimed in claim 1, wherein the modulation of the modulated signal is frequency modulation; and wherein modulated frequencies for individual modulation states of the modulation are not harmonic to each other.

11. The method as claimed in claim 1, wherein the modulation of the modulated signal has a duty cycle of at least 50%.

12. The method as claimed in claim 11, wherein the modulation of the modulated signal has a duty cycle of at least 75%.

13. The method as claimed in claim 1, wherein the modulation of the modulated signal has a constant duty cycle across different modulation states.

14. The method as claimed in claim 1, wherein the carrier frequency is constant.

15. The method as claimed in claim 1, wherein the at least one piece of data information comprises one of device-specific information, authorization information and authentication information.

16. A system for data transmission, comprising:

a transmitter including a modulation device and a light emitter, a receiver with a camera, in which image capture occurs sequentially in time as image rows or image columns; and a computing device including memory;

wherein the system is configured to:

a) provide at least one piece of data information;

b) modulate a carrier signal with a carrier frequency by the modulation device utilizing the at least one piece of data information to form a modulated signal;

c) transmit the modulated signal as a light signal by the light emitter of the transmitter;

d) receive the light signal by the camera of the receiver, which captures an image, comprising image rows and image columns, sequentially in time as image rows or image columns, an image row or an image column being captured at least twice as fast as a period of duration of the carrier signal;

e) determine, by the computing device, a first piece of image information and at least one second piece of image information from the image by reading row-by-row or column-by-column, analogous to the capture in step d), which are based on at least one section of respective image rows or image columns;

f) form a data stream via concatenation of the first and at least one second piece of image information by the computing device; and g) calculate a signal frequency from the formed data stream and identifying the at least one piece of data information from the signal frequency by the computing device.

17. The system as claimed in claim 16, wherein the transmitter comprises a technical device with an optical operating status indicator, the light emitter is formed by the operating status indicator, and the receiver comprises a mobile device.

18. The system as claimed in claim 17, wherein the mobile device comprises a smartphone or tablet computer.

19. The system as claimed in claim 1, wherein the at least one piece of data information comprises one of device-specific information, authorization information and authentication information for the technical device, which is intended for data transmission in the system.

\* \* \* \* \*